(12) United States Patent
Schneider et al.

(10) Patent No.: US 9,470,786 B2
(45) Date of Patent: Oct. 18, 2016

(54) METHODS FOR DETECTING THE FLIGHT PATH OF PROJECTILES

(75) Inventors: Robert Schneider, Burgrieden (DE); Georg Weiss, Kipfenberg (DE); Wilhelm Gruener, Ulm (DE)

(73) Assignee: EADS Deutschland GmbH, Ottobrunn (DE)

(*) Notice: Subject to any disclaimer, the term of this patent is extended or adjusted under 35 U.S.C. 154(b) by 427 days.

(21) Appl. No.: 14/002,618

(22) PCT Filed: Feb. 29, 2012

(86) PCT No.: PCT/DE2012/000209
§ 371 (c)(1),
(2), (4) Date: Sep. 20, 2013

(87) PCT Pub. No.: WO2012/116689
PCT Pub. Date: Sep. 7, 2012

(65) Prior Publication Data
US 2014/0009321 A1    Jan. 9, 2014

(30) Foreign Application Priority Data

Mar. 1, 2011    (DE) .................. 10 2011 012 680

(51) Int. Cl.
*G01S 13/58*    (2006.01)
*G01S 13/50*    (2006.01)
(Continued)

(52) U.S. Cl.
CPC .............. *G01S 13/505* (2013.01); *G01S 13/58* (2013.01); *G01S 13/723* (2013.01); *G01S 13/726* (2013.01); *G01S 13/44* (2013.01)

(58) Field of Classification Search
CPC .............................. G01S 13/505; G01S 13/58
See application file for complete search history.

(56) References Cited

U.S. PATENT DOCUMENTS 4,057,708 A * 11/1977 Greeley .................... F41J 5/12
235/413
5,071,087 A * 12/1991 Gray ........................ G05D 1/12
244/3.15
(Continued)

FOREIGN PATENT DOCUMENTS

DE    29 42 355 A1    6/1980
DE    40 08 395 A1    9/1991
(Continued)

OTHER PUBLICATIONS

Allen, Mark R. Et al., "A Low-Cost Radar Concept for Bullet Direction Finding", Science Applications International Corporation, pp. 202-207, Proceeding of the 1996 IEEE National Radar Conference, San Diego, USA, XP002678121.
(Continued)

*Primary Examiner* — Matthew M Barker
(74) *Attorney, Agent, or Firm* — Crowell & Moring LLP

(57) ABSTRACT

Methods for detecting the flight path of projectiles involve a sequence of N target detections that include detecting the measured velocities and azimuthal angle bearings of the projectile along the flight path of the projectile by Doppler radar at the times tn, wherein n=1 . . . N, and determining the flight path and the direction of motion of the projectile are from these measurements. The measurements are adapted in a first nonlinear parameter fit to an analytical relationship of the time curve of the radial velocity of the projectile while the projectile passes through the detection range of the radar and so that the absolute projectile velocity, minimum distance of the project flight path from the radar, time at which the projectile passes the point having the minimum distance, flight path direction in azimuth, and flight path direction in elevation can be estimated.

10 Claims, 3 Drawing Sheets

Figure 1:
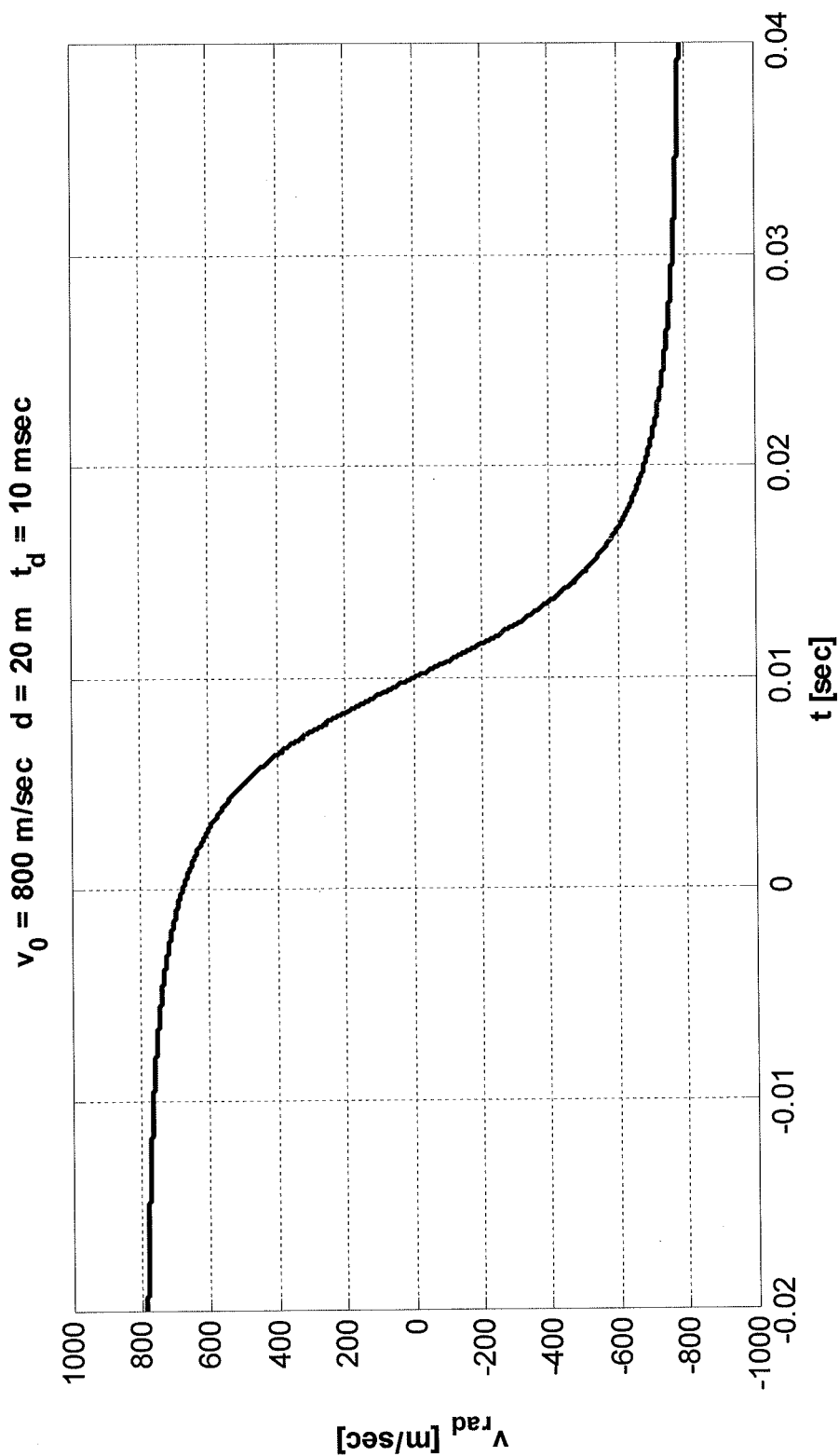

(51) Int. Cl.
*G01S 13/72* (2006.01)
*G01S 13/44* (2006.01)

(56) References Cited

U.S. PATENT DOCUMENTS

| | | | |
|---|---|---|---|
| 8,149,156 B1* | 4/2012 | Allred | G01S 13/583 |
| | | | 342/146 |
| 8,280,113 B2* | 10/2012 | Agurok | F41H 13/00 |
| | | | 235/411 |
| 2008/0169967 A1 | 7/2008 | Wood et al. | |
| 2010/0171649 A1 | 7/2010 | Durand et al. | |

FOREIGN PATENT DOCUMENTS

| | | |
|---|---|---|
| DE | 40 12 247 A1 | 10/1991 |
| DE | 10 2006 006 983 A1 | 8/2007 |
| GB | 2 033 691 A | 5/1980 |

OTHER PUBLICATIONS

International Search Report dated Nov. 11, 2012 w/ partial English translation (seven (7) pages).

* cited by examiner

METHODS FOR DETECTING THE FLIGHT PATH OF PROJECTILES

BACKGROUND AND SUMMARY OF THE INVENTION

Exemplary embodiments of the present invention relate to methods for detecting the trajectories of projectiles.

Soldiers in action in crisis regions are constantly at threat of being fired at by hand weapons from behind (e.g. by so-called snipers).

Methods are already known for deriving information regarding position and direction from which the shot is fired. These methods involve acoustic sensors that determine the position of the shooters from the muzzle blast. Such acoustic sensors are disadvantageous because they require multiple spatially distributed and networked supporting positions (microphones). Moreover, such acoustic systems can easily be disturbed by ambient noise. Accordingly, acoustic sensors cannot be used on travelling or flying platforms or can only be used thereon in a limited manner.

Optical methods are also known for attempting to discover the optical sights of sharpshooter weapons. The application area of these systems is strictly limited because the firing of other hand weapons cannot be detected. These systems are also significantly adversely affected in their efficiency by ambient influences such as light sources or dust.

German patent document DE 10 2006 006 983 A1 discloses a method for detecting the trajectory and direction of motion of projectiles by means of a coherent pulse Doppler radar. The measurement of distance to a detected object involves using the transition time of the echo pulse, while the projectile speed is advantageously determined by means of the Doppler frequency shift in the echo signal.

Another method for detecting the trajectory and direction of motion of projectiles is disclosed in the publication Allen, M. R.; Stoughton, R. B.; A Low Cost Radar Concept for Bullet Direction Finding Proceedings of the 1996 IEEE National Radar Conference, 13-16 May 1996, pp 202-207.

German patent document DE 40 12 247 A1 discloses a sensor system, with which the azimuth angle, elevation angle, radial distance and radial speed of a target are measured.

German patent document DE 40 08 395 A1 discloses a monopulse radar for determining the azimuth, elevation and distance of a projectile.

Exemplary embodiments of the present invention provide a method that can reliably and universally detect the trajectory and direction of motion of projectiles.

In order to determine the trajectory parameters of projectiles (e.g. rifle bullets), it is assumed that they travel in a straight line and the speed in the detection region is constant. These assumptions are permissible in a number of applications, in which it is a case of detecting the penetration of projectiles into a protection zone and the determination of the direction from which the shot originated. Only either the direction in the plane (azimuth) or in addition the elevation direction is of interest here.

A continuous wave Doppler radar with the capability for indicating a bearing can be advantageously used as a sensor in the present invention. The angular resolution can be achieved either with a plurality of receiving antennas or sending/receiving antennas with a directional effect or with digital beam forming (DBF). The analysis of the Doppler signal enables the measurement of the radial speed components of the detected objects. The coverage of the radar sensor can be divided into individual angular segments, which are detected with spatially distributed individual and/or multiple sensors (sending/receiving modules).

Because projectiles typically have a higher speed than all other reflecting objects, the extraction of relevant signals can be accomplished by spectral discrimination in the form of high pass filtering. This also applies if the sensor is disposed on a moving platform (with a ground speed of up to about 300 km/h). This results in effective clutter suppression.

BRIEF DESCRIPTION OF THE DRAWING FIGURES

Figure 2:
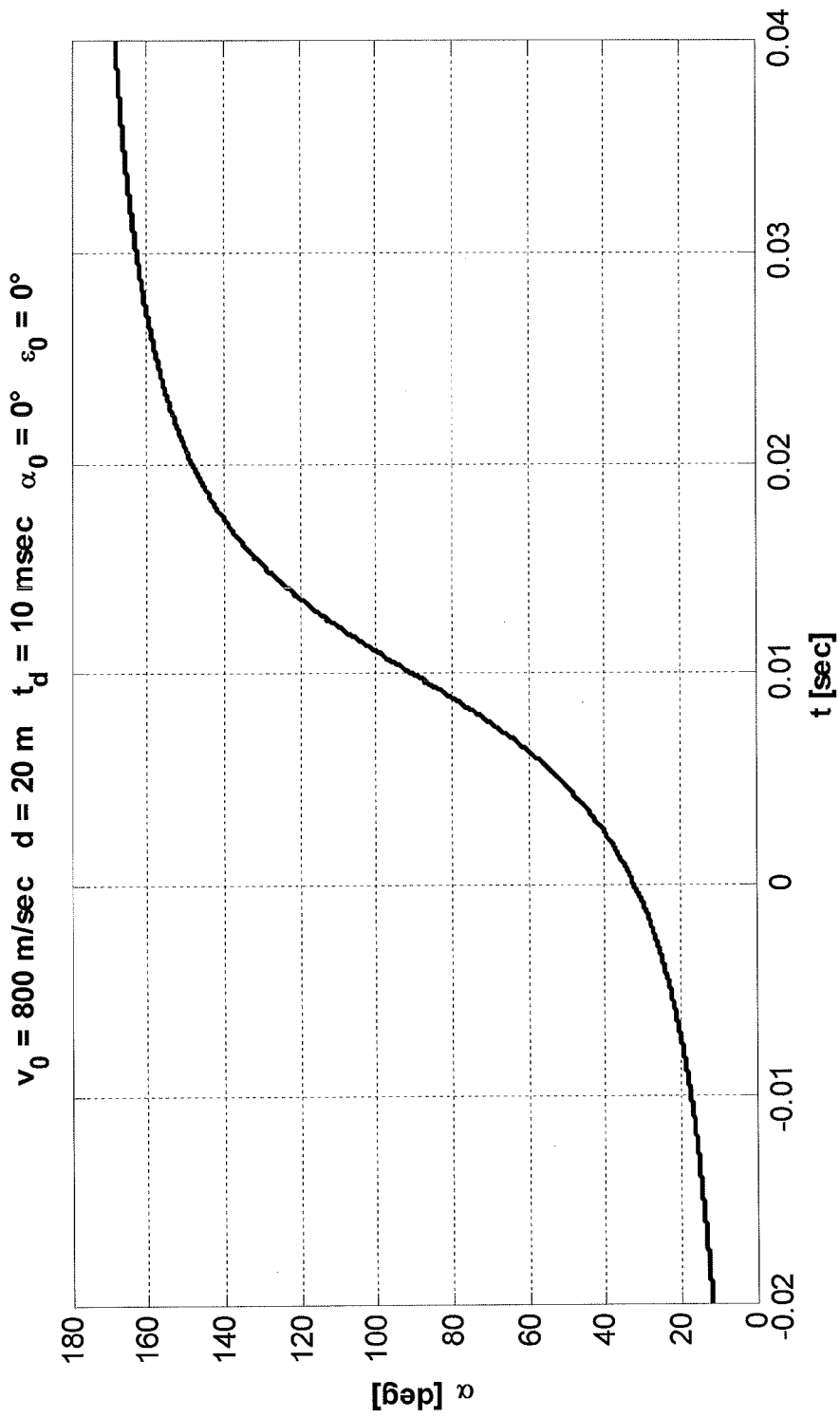
Figure 3:
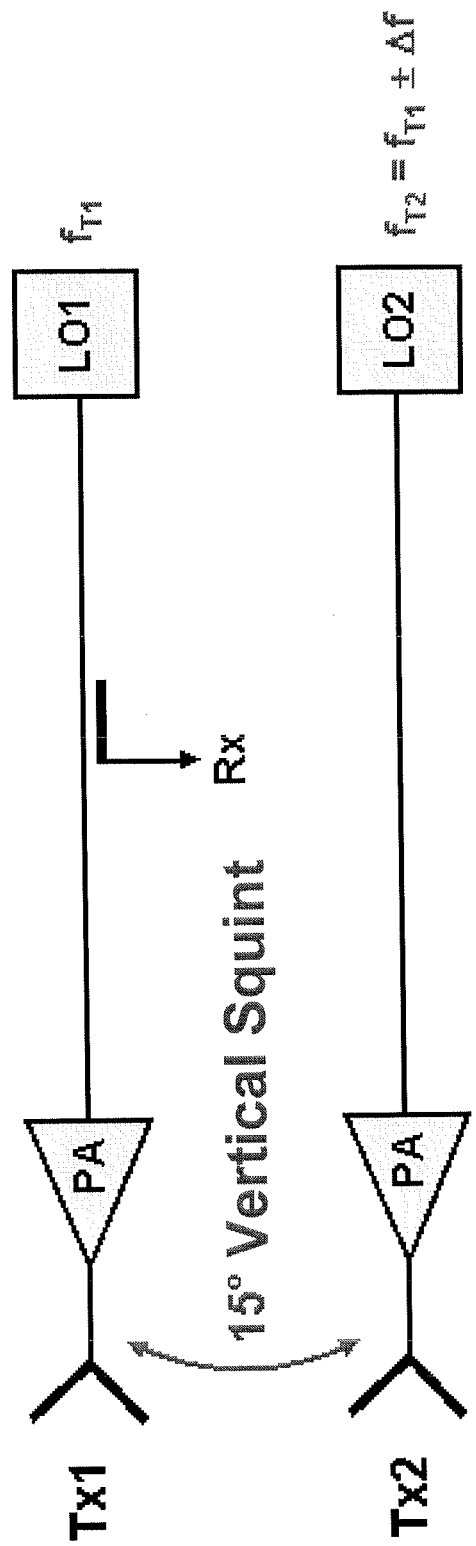

The invention is explained in detail below using figures. In the figures:

FIG. 1 shows an exemplary time profile of the radial speed components during a fly-past of the radar by a projectile, FIG. 2 shows an exemplary time profile of the bearing in azimuth during a lateral fly-past of the sensor by a projectile, and FIG. 3 shows an exemplary expansion circuit of a Doppler radar sensor for vertical bearing indication.

DETAILED DESCRIPTION

The time profile of the radial speed $v_{rad}(t)$ when passing through the detection region of the sensor is—independently of the direction of the projectile trajectory—described by the analytical relationship (1) below, which is also described in German patent document DE 29 42 355 A1. It is assembled where appropriate from the data measured by the sensor within multiple antenna lobes—a sensor is understood to be a continuous wave Doppler radar in the following:

$$v_{rad}(t) = \frac{v_0^2 \cdot (t_d - t)}{\sqrt{v_0^2(t_d - t)^2 + d^2}}. \tag{1}$$

Here v0 designates the absolute projectile speed, d is the minimum distance of the trajectory from the sensor (even if this point is never in fact reached, because the projectile e.g. strikes the ground beforehand), and td is the point in time at which the projectile passes the point of closest approach (POCA). At the point the radial component of the speed urad(t) is reduced to zero, which is quite clearly shown.

In FIG. 1 such a profile of the radial speed is shown as an example for the fly-past of a projectile with an airspeed of 800 m/sec at a distance of 20 m from the sensor, wherein the POCA is achieved at point in time $t = t_d = 10$ msec.

From a series of N target recordings provided by the Doppler sensor at the points in time $t_n$ with n=1 . . . N with measured speeds $v_{rad}(t_n)$, a non-linear parameter fit to the relationship (1) is performed to determine the parameters $v_0$, d and $t_d$ or to estimate them in the sense of a least mean square error (LMSE). Because there are three unknowns, at least N=3 measurement points are necessary for this. Suitable algorithms for this are e.g. provided in the curve fitting toolbox of MATLAB®.

The relationship of the bearing indication of the radar sensor to the projectile trajectory in space can be derived from their vectorial description. The trajectory is given as a point-direction equation of a straight line with the speed vector u and the position vector at the POCA d by the time function:

$$r(t) = d + v \cdot (t - t_d), \tag{2}$$

which is identical to the direction vector between the sensor and the projectile, if the radar sensor is assumed to be positionally fixed at the origin of the coordinate system.

The Cartesian components of the direction vector r can be expressed using the direction angle in azimuth α and elevation ε according to the spherical coordinate representation as:

$$r = \begin{pmatrix} r_x \\ r_y \\ r_z \end{pmatrix} = |r| \begin{pmatrix} \sin\alpha \cdot \cos\varepsilon \\ \cos\alpha \cdot \cos\varepsilon \\ \sin\varepsilon \end{pmatrix}, \quad (3)$$

wherein (2) is written as:

$$|r(t)| \begin{pmatrix} \sin\alpha(t) \cdot \cos\varepsilon(t) \\ \cos\alpha(t) \cdot \cos\varepsilon(t) \\ \sin\varepsilon(t) \end{pmatrix} = \quad (4)$$

$$d \begin{pmatrix} \sin\alpha_d \cdot \cos\varepsilon_d \\ \cos\alpha_d \cdot \cos\varepsilon_d \\ \sin\varepsilon_d \end{pmatrix} + v_0 \begin{pmatrix} \sin\alpha_0 \cdot \cos\varepsilon_0 \\ \cos\alpha_0 \cdot \cos\varepsilon_0 \\ \sin\varepsilon_0 \end{pmatrix} \cdot (t - t_d)$$

Here α(t) and ε(t) refer to the bearings of the radar sensor against time, $\alpha_d$ and $\varepsilon_d$ to the angular directions at the POCA, and $\alpha_0$ and $\varepsilon_0$ to the directions of the trajectory in azimuth and elevation, i.e. the ultimately sought variables.

Forming a quotient from the x and y components of the trajectory (4) results in:

$$\frac{r_x(t)}{r_y(t)} = \frac{\sin\alpha(t)}{\cos\alpha(t)} = \tan\alpha(t) = \frac{d\sin\alpha_d\cos\varepsilon_d + \sin\alpha_0\cos\varepsilon_0 \cdot v_0(t-t_d)}{d\cos\alpha_d\cos\varepsilon_d + \cos\alpha_0\cos\varepsilon_0 \cdot v_0(t-t_d)} \quad (5)$$

now independently of the distance |f(t)| to the projectile.

Turing first to the case that the radar sensor provides bearing values in azimuth α(t) for determining the trajectory direction in azimuth $\alpha_0$. For this (5) can be put into the following form:

$$\alpha(t) = \arctan \frac{d\sin\alpha_d k_\varepsilon + \sin\alpha_0 \cdot v_0(t-t_d)}{d\cos\alpha_d k_\varepsilon + \cos\alpha_0 \cdot v_0(t-t_d)}. \quad (6)$$

The elevation-dependent variables are combined into a single term:

$$k_\varepsilon = \frac{\cos\varepsilon_d}{\cos\varepsilon_0} \quad (7)$$

For the case of a projectile with $v_0$=800 m/sec, d=20 m and $t_d$=10 msec, the time profile of the azimuth bearing α(t) is illustrated in FIG. 2 as an example. Simplified for the sake of interpretability, it is assumed that the projectile goes right past the sensor at the height of the sensor coming from the direction $\alpha_0$=0° and $\varepsilon_0$=0°, and it is thus easily shown that the following applies: $\alpha_d$=90°, $\varepsilon_d$=0° and thus $k_\varepsilon$=1.

From a series of N radar sensor measured azimuth bearings α($t_n$) at the known points in time $t_n$ with n=1 . . . N, the parameters $\alpha_0$ and $k_\varepsilon$ are determined using a second non-linear parameter fit to relationship (5). If there is no bearing in elevation, the variable $k_\varepsilon$ is of no further use for the description of the trajectory. It can still be determined that in (5) the influence of the elevation direction of the flight track $\varepsilon_0$ is separated from the determination of $\varepsilon_0$ and thus no systematic errors occur. In order to enable definite parameter extraction for $\varepsilon_0$ over the entire 360° range, the four quadrant arc tangent can be adopted in (5) by taking into account the sign of the numerator and denominator.

When carrying out the second parameter fit of the azimuth bearing values α($t_n$) to (5), the values for $v_0$, d and $t_d$ are to be used, which were obtained during the first parameter fit to (1) using the speed measurement values. The value for $\alpha_d$, i.e. the azimuth bearing in the direction of the POCA, is to be derived from the bearing values α($t_n$). Because, however, at the POCA the radial components of the speed are zero, there are no bearings in the immediate surroundings of the POCA because of the high pass clutter filtering. Instead an interpolation of the series of measurement values α($t_n$) at the point in time t=$t_d$ can be carried out: $\alpha_d$=α($t_d$).

In the case that the radar sensor also carries out elevation direction finding besides the azimuth direction finding, the described method can be expanded in an advantageous embodiment by a further step for flight track direction determination in elevation.

One approach is the combination of the vector components of (4) in the form:

$$\left(\frac{r_x(t)}{r_y(t)}\right)^2 + \left(\frac{r_x(t)}{r_y(t)}\right)^2 = \frac{1}{\tan^2\varepsilon(t)}, \quad (8)$$

which results in the following expression:

$$\tan\varepsilon(t) = \frac{d\sin\varepsilon_d + \sin\varepsilon_0 \cdot v_0(t-t_d)}{\sqrt{(d\cos\alpha_d\cos\varepsilon_d + \cos\alpha_0\cos\varepsilon_0 \cdot v_0(t-t_d))^2 + (d\sin\alpha_d\cos\varepsilon_d + \sin\alpha_0\cos\varepsilon_0 \cdot v_0(t-t_d))^2}}. \quad (9)$$

Also the target distance |r(t)| is no longer contained in the relationship and an analysis is possible purely on the basis of speed and bearing information.

By means of a third non-linear parameter fit the functional relationship of the right side of (9), in which the elevation direction of the flight track $\varepsilon_0$ is the single remaining unknown variable, is adapted to the series of values tan ε($t_n$) formed from the measured bearing values. The previously determined variables d, $v_0$, $t_d$, $\alpha_d$ and $\alpha_0$ are to be used as known, and $\varepsilon_d$ is in turn to be determined by interpolation from the elevation bearing values ε($t_n$) at the point in time t=$t_d$: $\varepsilon_d$=ε($t_d$).

According to the invention the following parameters are available to describe the projectile's trajectory:
  speed $v_0$,
  minimum distance from the sensor d,
  point in time of the minimum distance $t_d$,
  azimuth direction of the position with minimum distance (POCA) $\alpha_d$,
  azimuth direction of the trajectory $\alpha_0$.

In one particular embodiment of the invention, following a third parameter fit according to the features of claim 2 there are further parameters available for the description of the projectile's trajectory:
  optional: elevation direction of the position with minimum distance $\varepsilon_d$,
  optional: elevation direction of the trajectory $\varepsilon_0$.

If it can be assumed that multiple projectiles can be simultaneously present in the detection region of the sensor, time tracking can be carried out before the use of the parameter extraction based on (1), (6) and possibly (9) for segmentation of the measurement values for speed and bearing. The flight track parameters can then be determined separately for each segment (projectile). Under the assumption that such scenarios only occur when firing salvos of projectiles, the parameter fit can be optimized to determine a single trajectory direction.

The bearing indication in the radar sensor can take place by means of amplitude monopulse or phase monopulse. According to the invention there is a simple alternative approach to expansion of the method by elevation direction finding: The illuminator antenna is implemented in dual form with a vertical angular offset between the antennas. Both antennas transmit simultaneously with slightly different frequencies $f_{Tx1}$ and $f_{Tx2}=f_{Tx1}+\Delta f$ (difference e.g. a few 100 Hz to a few kHz), which can be carried out in parallel in the entire signal path of the receiver including digitization. Both spectral lines only appear separately in the Doppler analysis, their amplitude ratio in the sense of an amplitude monopulse for the two mutually inclined illuminator antennas enabling elevation direction finding. On the receiver side there is thus no additional hardware cost, which is clear on the transmitter side. A circuit diagram showing the principle for said direction finding concept is shown in FIG. 3.

When carrying out the Doppler analysis using a numerically efficient FFT the following problem occurs: the time profile of the Doppler frequency (proportional to the radial speed components, see FIG. 1) allows only coherent integration times of typically a few milliseconds. Moreover, the resulting peak is spread within the Doppler spectrum (Doppler walk), so that there is no further integration gain in a conventional manner. However, extended integration times can be achieved according to the invention by acquiring the Doppler signal as a sectional linear chirp and carrying out various hypothetical corrections with chirps of different lengths and gradients with rising and falling frequency by multiplication in the time domain prior to the Doppler FFT. All of these corrected signal blocks are then subjected to the FFT, and in the case of the correct correction approx. 10 dB higher integration gains and thus system sensitivities can be achieved. Alternatively, modified ISAR processing is also conceivable, but this will not be discussed further here.

Depending on the operating frequency of the radar sensor, the resulting relevant Doppler shifts can be so small that they lie in the frequency range of low frequency noise (1/f-noise) or mechanical microphonic effects. In this case a sinusoidal frequency modulation of the continuous wave transmission signal and an analysis of the reception signal can advantageously be used for the second harmonic of the modulation frequency [see, for example, M. Skolnik: Introduction to Radar Systems, ed. 2].

Finally, a typical system design for the radar sensor is mentioned as an example:
- working frequency in the $K_u$-Band (e.g. 16 GHz)
- four sensor segments (quadrants), each with a broad illuminator and 12 receiving antenna lobes in azimuth by means of DBF
- transmission power 1 W
- sampling frequency 300 kHz
- clutter high pass filter with 10 kHz corner frequency
- integration times 1 . . . 10 msec.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for the detection of the trajectory of projectiles, comprising:
   recording, by a continuous wave Doppler radar that is configured for both bearing indication and speed measurement, a series of N target detections at points in time $t_n$ with n=1. . . N with measured speeds $v_{rad}(t_n)$ and azimuthal angle bearings $\alpha(t_n)$ of the projectile along the trajectory of the projectile, wherein the continuous wave Doppler radar comprises a plurality of transmission/reception modules for different spatial angle sectors;
   determining a trajectory and direction of motion of the projectile based on the measured speeds $v_{rad}(t_n)$ and azimuthal angle bearings $\alpha(t_n)$ of the projectile along the trajectory of the projectile, wherein said determining the trajectory and direction of motion of the projectile comprises:
      estimating absolute projectile speed $v_0$, minimum distance of projectile trajectory from the radar d, and estimated point in time $t_d$ at which the projectile passes a point at a minimum distance d by adapting the speed measurements $v_{rad}(t_n)$ in a first non-linear parameter fit to an analytical relationship of a time profile of the measured radial speed $v_{rad}(t)$ of the projectile when passing through the detection region of the radar,
      estimating a trajectory direction in azimuth $\alpha_0$ by adapting, in a second non-linear parameter fit, the measured azimuthal angle bearings $\alpha(t_n)$ to an analytical relationship of a time profile of the angular direction in azimuth $\alpha(t)$, and
      determining an azimuth direction of the point $\alpha_d$ at the minimum distance of the projectile trajectory from the continuous wave Doppler radar by interpolating the series of the measured azimuthal angle bearings $\alpha(t_n)$ at a point in time $t=t_d$
   wherein a transmission antenna of at least one of the plurality of transmission/reception modules includes two antennas having a vertical angular offset and transmitting simultaneously with different frequencies $f_{Tx1}$ and $f_{Tx2}=f_{Tx1}+\Delta f$, wherein the frequency difference $\Delta f$ is from 100 Hz to 100 kHz.

2. The method as claimed in claim 1, wherein an additional series of N angular bearings of the projectile in elevation $\epsilon(t_n)$ along the trajectory of the projectile is recorded, a trajectory direction in elevation $\epsilon_0$ is estimated by adapting the measurements in a third non-linear parameter fit to an analytical relationship of the time profile of an angular direction in elevation $\epsilon(t)$, and determining the azimuth direction of a point $\epsilon_d$ at the minimum distance of the projectile trajectory from the continuous wave Doppler radar by interpolation of the series of measurement values $\epsilon(t_n)$ at the point in time $t=t_d$.

3. The method as claimed in claim 1, wherein the azimuthal angle bearings are measured using a amplitude monopulse or phase monopulse.

4. The method as claimed in claim 1, wherein directionally selective antenna patterns are generated using digital beam forming.

5. The method as claimed in claim 1, a transmission signal of the continuous wave Doppler radar is subjected to a sinusoidal frequency modulation, wherein a frequency range is analyzed for a second harmonic of the modulation signal in a radar receiver.

6. The method as claimed in claim 1, further comprising:
band pass sampling a received signal to digitize the received signal.

7. The method as claimed in claim 6, further comprising:
integrating the received signal using FFT blocks with different lengths to extend coherent integration time in Doppler processing.

8. The method as claimed in claim 7, wherein prior to the integration of the received signal, a hypothetical correction of a profile of the received signal is performed by multiplication with a set of linear frequency chirps of different ramp gradient and time duration.

9. The method as claimed in claim 1, wherein a working frequency of the continuous wave Doppler radar is in a $K_u$ band or K band.

10. The method as claimed in 1, wherein a working frequency of the continuous wave Doppler radar is in a S band or C band.

* * * * *